United States Patent
Lee et al.

(10) Patent No.: US 6,823,219 B2
(45) Date of Patent: Nov. 23, 2004

(54) UNIVERSAL OPTICAL CONTROL AND MANAGEMENT PLATFORM

(75) Inventors: Wayne Y. Lee, Half Moon Bay, CA (US); Dan Dan Yang, Los Altos, CA (US)

(73) Assignee: Dowslake Microsystems Corporation, Santa Clara, CA (US)

( * ) Notice: Subject to any disclaimer, the term of this patent is extended or adjusted under 35 U.S.C. 154(b) by 581 days.

(21) Appl. No.: 09/855,596

(22) Filed: May 16, 2001

(65) Prior Publication Data

US 2003/0033025 A1 Feb. 13, 2003

(51) Int. Cl.[7] .............................................. G05B 11/01
(52) U.S. Cl. ............................ 700/19; 700/20; 700/59; 700/65; 340/855.4; 340/855.5; 370/395.6; 370/395.65; 398/106; 398/107; 398/115
(58) Field of Search ................................ 700/1, 19, 20, 700/59, 65, 95, 117; 398/106, 107, 109, 111, 115, 118, 95, 22–25; 340/855.4, 855.5; 370/395.52, 395.6, 395.65

(56) References Cited

U.S. PATENT DOCUMENTS

| | | | | |
|---|---|---|---|---|
| 6,243,759 | B1 | * | 6/2001 | Boden et al. ................ 709/238 |
| 6,269,099 | B1 | * | 7/2001 | Borella et al. .............. 370/389 |
| 6,678,250 | B1 | * | 1/2004 | Grabelsky et al. .......... 370/241 |
| 6,680,922 | B1 | * | 1/2004 | Jorgensen ................... 370/328 |
| 2002/0000931 | A1 | * | 1/2002 | Petronic et al. ............. 342/359 |

* cited by examiner

*Primary Examiner*—Ramesh Patel
(74) *Attorney, Agent, or Firm*—Cassan Maclean (57) ABSTRACT

An architecture for use in controlling and managing optical functions and optical devices. A common microprocessor based control layer coordinates commands between optical devices and a user station. The control layer executes an operating system which handles data flow in the control layer. Generic commands from the user station causes the operating system to call specific subroutines the produce digital commands. These digital commands are then passed to a digital layer that interfaces with an analog layer. The analog layer is specifically developed to interface and work with a specific optical device. The analog layer thus directly controls the optical device including changing its settings based on input from the digital layer.

3 Claims, 10 Drawing Sheets

UNIVERSAL OPTICAL CONTROL AND MANAGEMENT PLATFORM

FIELD OF THE INVENTION

The present invention relates to optical communications systems and, more specifically, to control systems for the control and management of optical functions in optical devices.

BACKGROUND TO THE INVENTION

The recent growth in telecommunications, spurred by the development and spread of the Internet, has led to increasing reliance on optical networks. The networks are being transformed from fixed, static configurations towards reconfigurable, dynamic rings and meshes. The innovation in the fiber optic component technology has also brought many promising controllable devices, such as filters, switches, and variable attenuators, to the market. System manufacturers are actively seeking to integrate both new and legacy fiber optic components into their networking systems. However, one problem with such networks is the long and expensive development cycle involved in integrating these optical devices into their networks. The reason for this cycle is in the nature of the optical devices. To be controlled, these hardware devices need electronics and software. A large effort, with its attendant costs, is therefore required to integrate the hardware optical devices with the electronics and the software before the optical devices can be turned into ready to plug-in line cards or subsystems.

The current practice in the industry is such that the optical subsystem is always designed around the optical device itself. As an example, if a new optical amplifier subsystem is required, the design begins with the choice of specific hardware and software required to drive the particular optical amplifier device. If technology develops and the chosen Erbium doped optical amplifier needs to be replaced with a semiconductor based optical amplifier, then both the hardware and the software have to be completely redesigned to work with the new amplifier.

Clearly this approach is problematic since replacement of the optical device will require a complete overhaul, redesign, and development of the control subsystem. This adds to the development cost and time for the optical device. It is also no guarantee that the subsystem control card will properly work with the system control card. Each optical device manufacturer currently supports its own control interface and its own standards of controlling its optical device.

From the above, what is required is a common and universal control system for the control and management of optical functions. The control system should include both the hardware and the software required to control different optical devices. The control system should also be able to control and manage different optical devices and resources without extensive redesign and reengineering. What is needed is a different type of system architecture that can be utilized to standardize control subsystems in the optical device industry. Such an architecture would decrease the development cost and time for optical devices.

SUMMARY OF THE INVENTION

The present invention meets the above need by providing an architecture for use in controlling and managing optical functions and optical devices. A common microprocessor based control layer coordinates commands between optical devices and a user station. The control layer executes an operating system which handles data flow in the control layer. Generic commands from the user station causes the operating system to call specific subroutines to produce digital commands. These digital commands are then passed to a digital layer that interfaces with an analog layer. The analog layer is specifically developed to interface and work with a specific optical device. The analog layer thus directly controls the optical device including changing its settings based on input from the digital layer.

The present invention provides a control system for use in controlling at least one optical device in an optical network, with each optical device being coupled to the control system through an analog based interface. The control system comprises a microprocessor based control layer and a digital layer coupled to said control layer. The digital layer receives digital commands from the control layer for conversion and transmission to the analog based interface. The control layer receives instructions from a remote user station for controlling the optical device. Each analog based interface is specifically constructed and designed to function with a specific optical device and the control layer and the digital layer are each capable of functioning with any optical device. The control layer executes a control program. The control program comprises: a plurality of optical function modules each function module being specific to an optical function performed by an optical device, an access module for receiving instructions from the user station, a digital layer for producing digital commands based on an input from at least one of the optical function modules, and a command module for receiving instructions from the access module and for causing the execution of at least one of the function modules based on the instructions such that execution of a function module produces the digital commands from the digital layer.

In another aspect, the invention provides an article of manufacture. The article comprises computer readable media containing computer readable and executable code for use in controlling at least one optical device based on instructions received from a remote user station. The code has a plurality of optical function modules, each function module being specific to an optical function performed by an optical device, an access module for receiving the instructions from the user station, a digital layer for producing digital commands based on an input from at least one of optical function modules, a command module for receiving instructions from the access module and for causing the execution of at least one of the function modules based on the instructions such that execution of a function module produces the digital commands from the digital layer.

Another aspect of the invention provides a computer system for controlling at least one optical device. The system comprises a central processing unit (CPU), a communications interface for transmitting and receiving messages to and from a user terminal, said communications interface being coupled to said central processing unit, a memory storage means for storing computer readable and computer executable code, said memory storage means being coupled to said CPU, and a plurality of I/O (input/output) ports, each port being for interfacing with an optical device, each of said I/O ports being coupled to said CPU. The computer readable and computer executable code having:

a plurality of optical function modules, each function module being specific to an optical function performed by an optical device;

an access module for transmitting and receiving said messages from said user station;

a digital layer for producing digital commands based on an input from at least one of said optical function modules;

a command module for receiving said messages from said access module and for causing the execution of at least one of said function modules based on said messages such that execution of a function module produces said digital commands from said digital layer.

A further aspect of the invention provides a method of communicating between a user terminal and a control system controlling at least one optical device. The method comprises:

a) creating a datagram at a source, said datagram having:
   a source address field;
   a source field denoting an address of a source optical device;
   a destination field denoting an address of a destination optical device;
   a system overhead field containing data;
   a command field containing an indication of at least one step to be executed regarding said data
b) transmitting said datagram to a destination
c) extracting said data at said source, and
e) initiating said at least one step.

The datagram is used internally by the control system to communicate between different modules in the control system.

Another aspect of the invention provides a datagram for use in communicating between a user terminal and a control system controlling at least one optical device. The datagram contains a source address field, a source field denoting an address of a source optical device, a destination field denoting an address of a destination optical device, a system overhead field containing data, and a command field containing an indication of at least one step to be executed regarding said data where the datagram is used internally by the control system to communicate between different modules in the control system.

In another aspect, the invention provides a communications signal transmitted between a user terminal and a control system for controlling at least one optical device. The signal has encoded thereon a datagram containing a source address field, a source field denoting an address of a source optical device, a destination field denoting an address of a destination optical device, a system overhead field containing data, and a command field containing an indication of at least one step to be executed regarding said data.

BRIEF DESCRIPTION OF THE DRAWINGS

A better understanding of the invention may be obtained by reading the detailed description of the invention below, in conjunction with the following drawings, in which.

DETAILED DESCRIPTION

Figure 1:
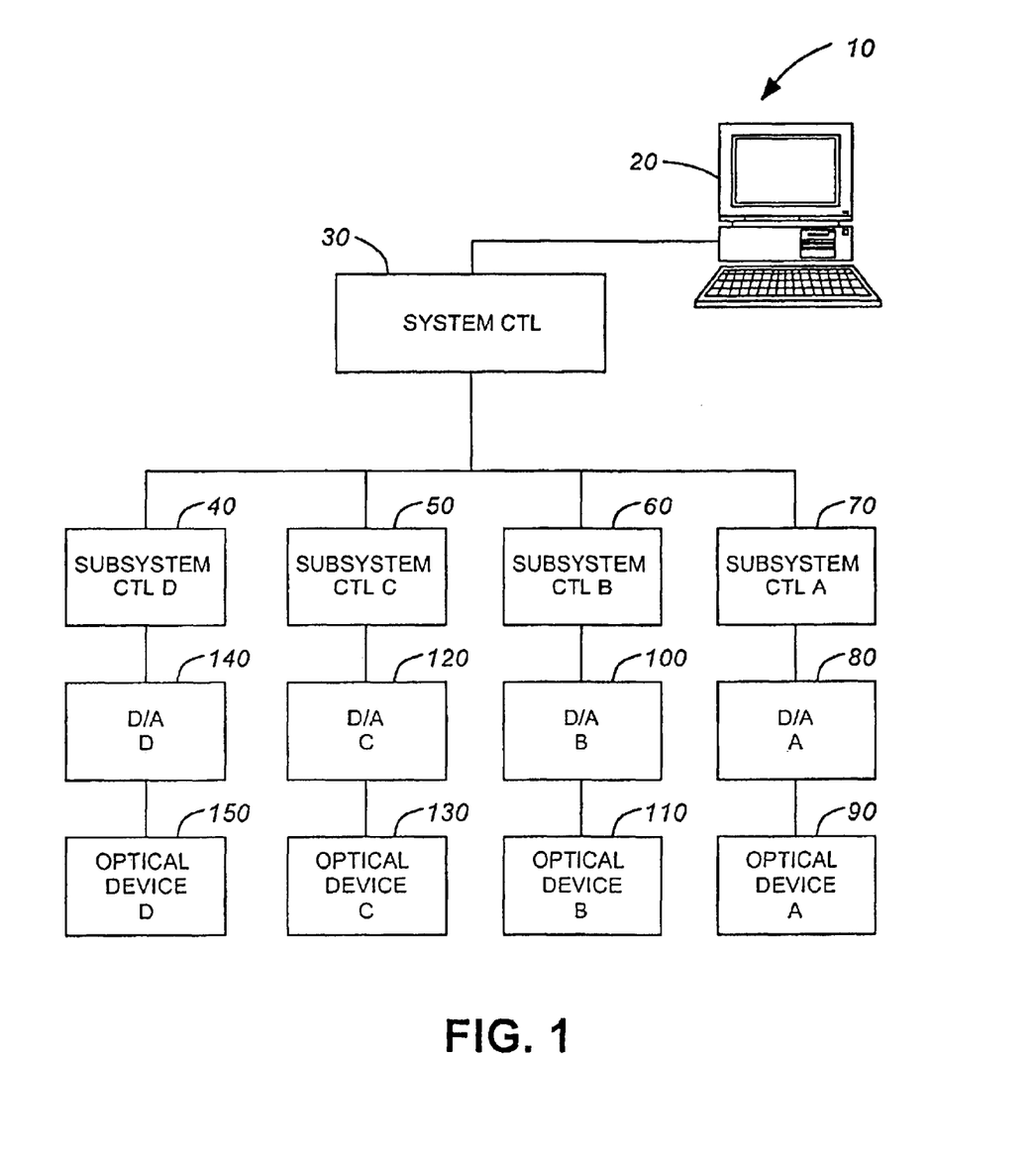
FIG. 1 is a block diagram of the currently used architecture for controlling optical devices.

Referring to FIG. 1, a block diagram of the currently used architecture 10 for controlling optical devices is illustrated. A user terminal 20 is coupled to a system controller 30. The system controller 30 is, in turn, coupled to subsystem controllers 40, 50, 60, 70. Each of these subsystem controllers controls a separate optical device. Subsystem controller A is connected to a D/A (digital/analog data exchange) circuit A 80 which directly controls optical device A 90. Similarly, subsystem controller B 60 is connected to D/A circuit B 100 which controls optical device B 110. Subsystem controller C 50 is coupled to D/A circuit C 120, in turn controlling optical device C 130. Subsystem controller D 40 controls D/A circuit 140 and, concomitantly, optical device D 150.

As explained above, each of the subsystems in FIG. 1 is specifically developed for a specific optical device. Thus, subsystem controller B 60 can only work with D/A circuit B 100 and only with optical device B 110. Similar issues arise with the other subsystems.

Figure 2:
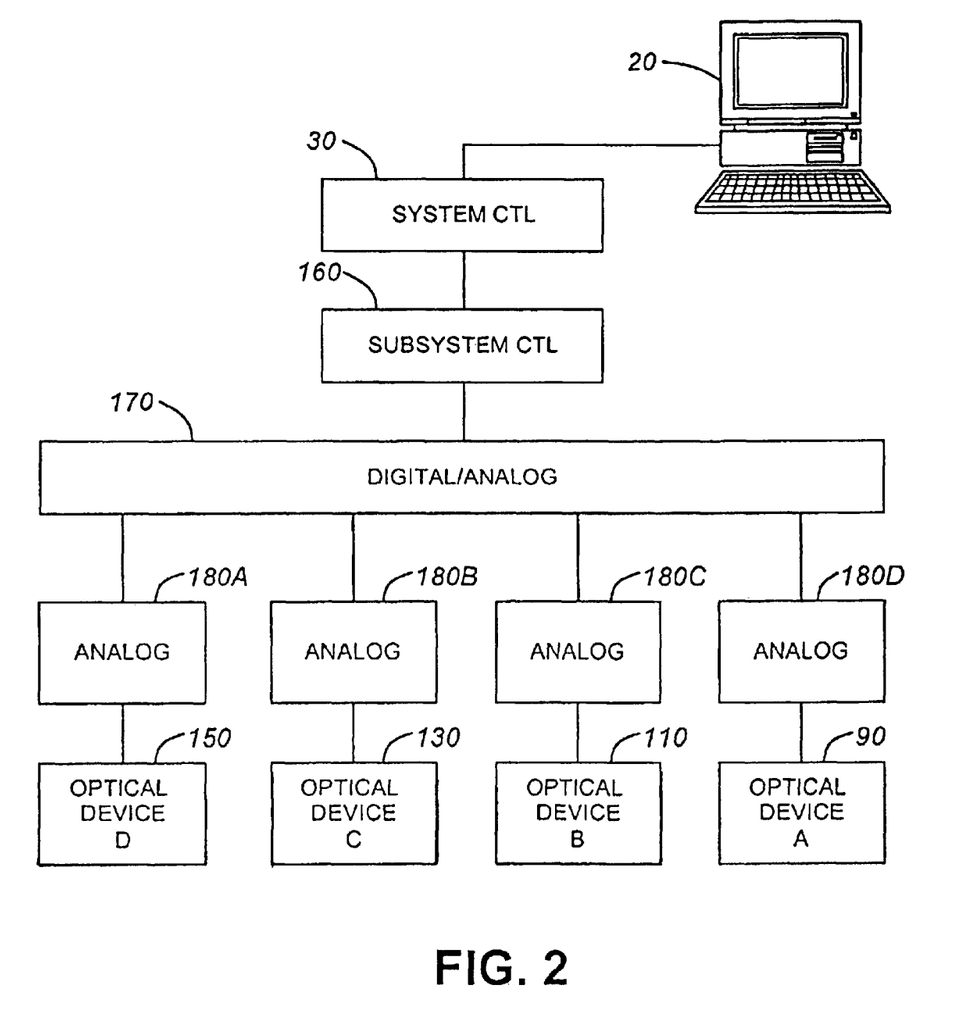
FIG. 2 is a block diagram of an architecture for controlling optical devices according to one aspect of the invention.

Referring to FIG. 2, an architecture according to one aspect of the invention is illustrated. A user terminal 20 is coupled to a system controller 30. However, system controller 30 is coupled to a single subsystem controller 160. The subsystem controller 160 is coupled to a digital layer 170 that converts commands from the unitary subsystem controller into an analog equivalent. Coupled to the digital layer are analog modules 180, 190, 200, 210. Each of these analog modules directly controls an optical device. As can be seen in the Figure, analog module 180 controls optical device D 150, analog module 190 controls optical device C 130, analog module 200 controls optical device B 110, and analog module 210 controls optical device A 90. In this architecture, only the analog modules are specifically developed to work with a specific optical device. The subsystem controller 160 (also known as a control layer) and the digital layer 70 are generic in that they can work with any optical device.

Figure 3:
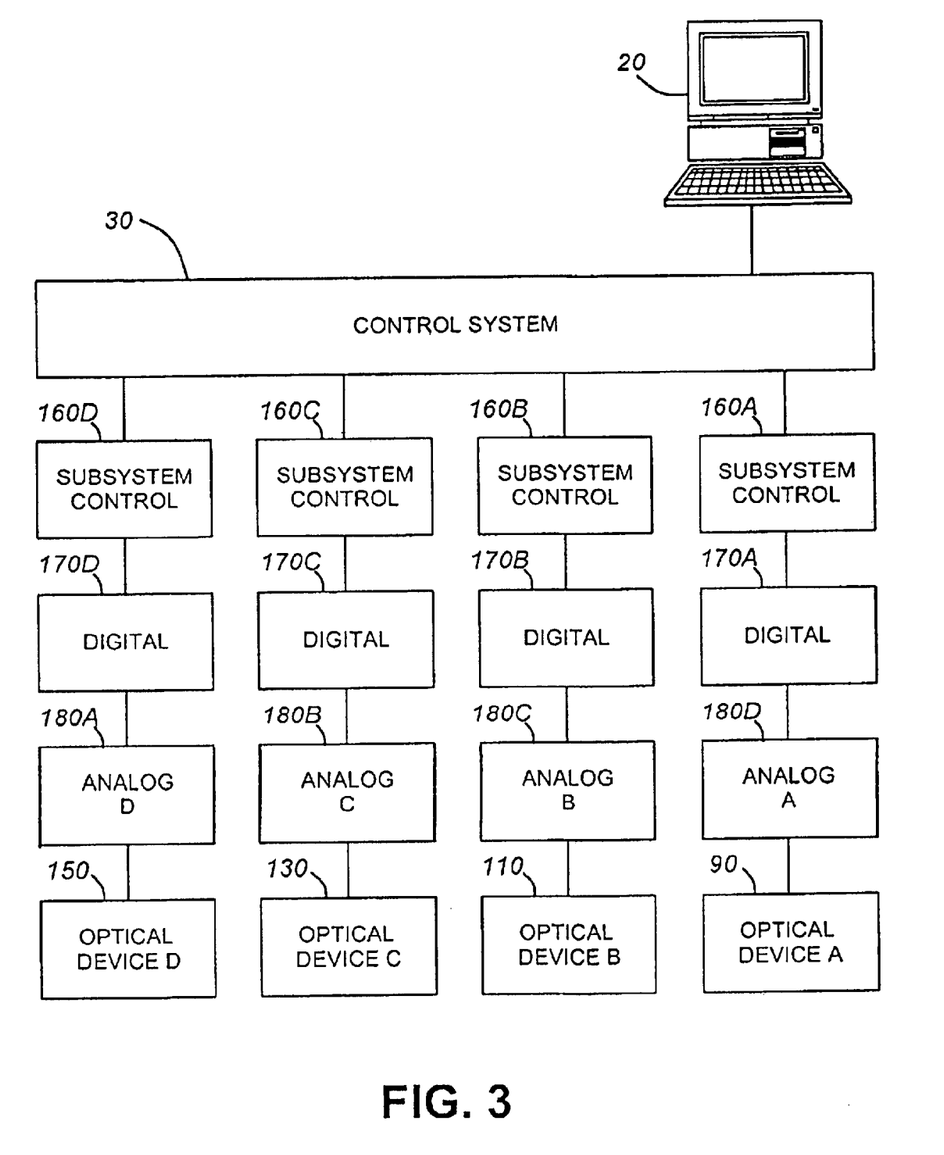
FIG. 3 is a block diagram of a variant of the architecture illustrated in FIG. 2.

Referring to FIG. 3, a variation of the architecture in FIG. 2 is illustrated. The user terminal communicates with a higher level control system 30 which communicates with multiple instances of the subsystem control block 160. In FIG. 3 these blocks are labeled as subsystem control blocks 160A, 160B, 160C, and 160D. Each of these blocks is identical to one another and is identical to the subsystem controller block 160 in FIG. 2. Similarly, digital blocks 170A, 170B, 170C, and 170D are identical to digital layer 170 in FIG. 2. Analog modules 180A, 180B, 180C, and 180D and the optical devices 90, 110, 130, and 150 are identical to similarly referenced blocks in FIG. 2. It should be noted that while only one optical device is attached to each of the subsystem controllers 160A–160D, multiple optical devices can be attached to each of these controllers.

The main difference between the architectures in FIGS. 2 and 3 is in the multiplicity of instances of subsystem control blocks in the control layer of FIG. 3. The functions and the hardware in each of the subsystem control blocks are identical.

Figure 3A:
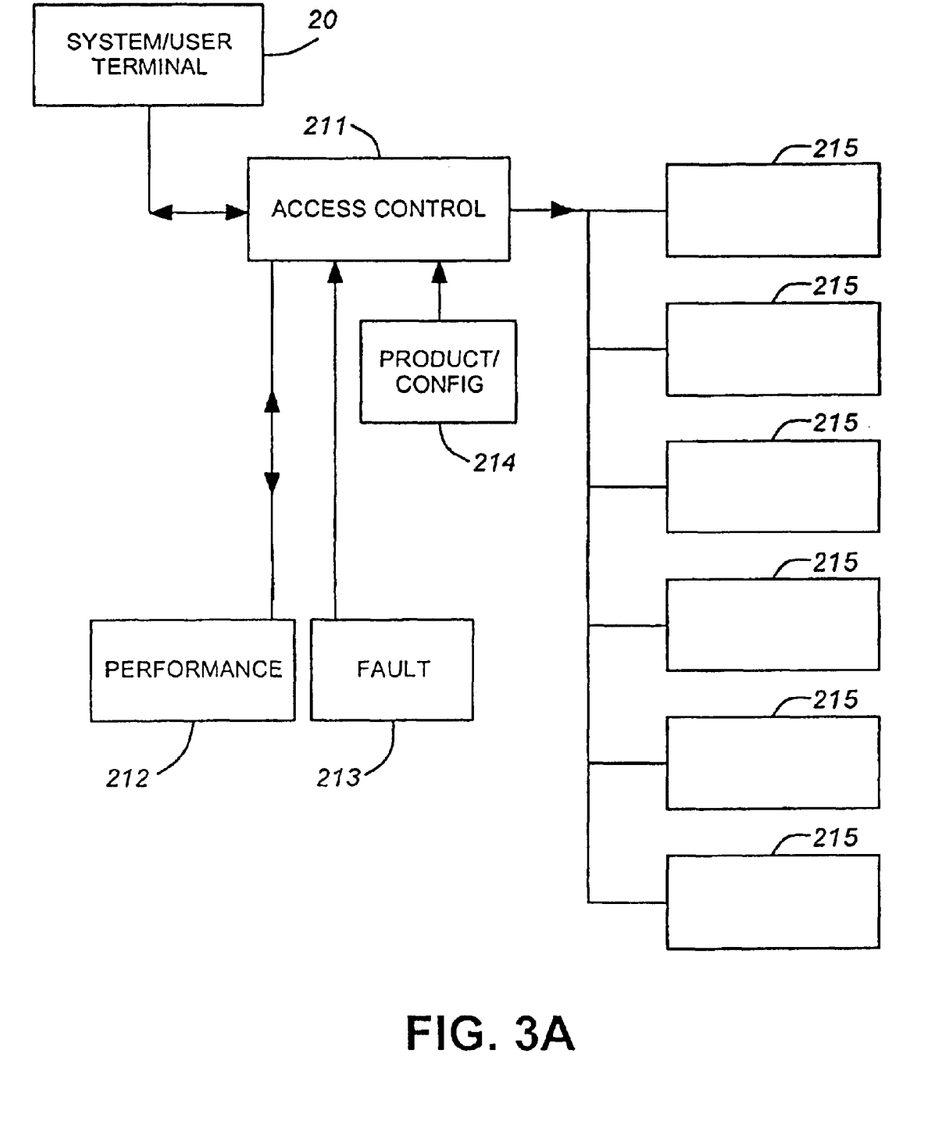
FIG. 3A is a block diagram of a high-level view of the function of the subsystem controller blocks in FIGS. 2 and 3.

To explain further the similarities between FIGS. 2 and 3, FIG. 3A illustrates a high level diagram of the function of each of the subsystem blocks in FIGS. 2 and 3. In FIG. 3A the subsystem block essentially acts as a gateway or as an access control between the system controller/user terminal 20 to optical functions as shown by blocks 212, 213, 214, and 215. If the user terminal needs to access optical functions related to the performance of the optical devices (see box 212) attached to the subsystem controller, the terminal has to use the subsystem controller. However, the datapath is not unidirectional—the optical devices attached to the controller can report to the user terminal through the subsystem controller. Thus, if faults or errors occur (see box 213 in FIG. 3A), the reporting of these faults must also be done through the subsystem controller. Configuration data embedded in the optical devices must also be accessed through the subsystem control (see box 214). Finally, control of the parameters of the optical devices (see boxes 215) can only be through the subsystem control. Thus, anyone wishing to control an optical device from a user terminal only needs to interface to the subsystem controller and does not need to design a completely new control system. The generic subsystem controller performs the control and management tasks that, before, needed to be designed into a subsystem controller.

Figure 3B:
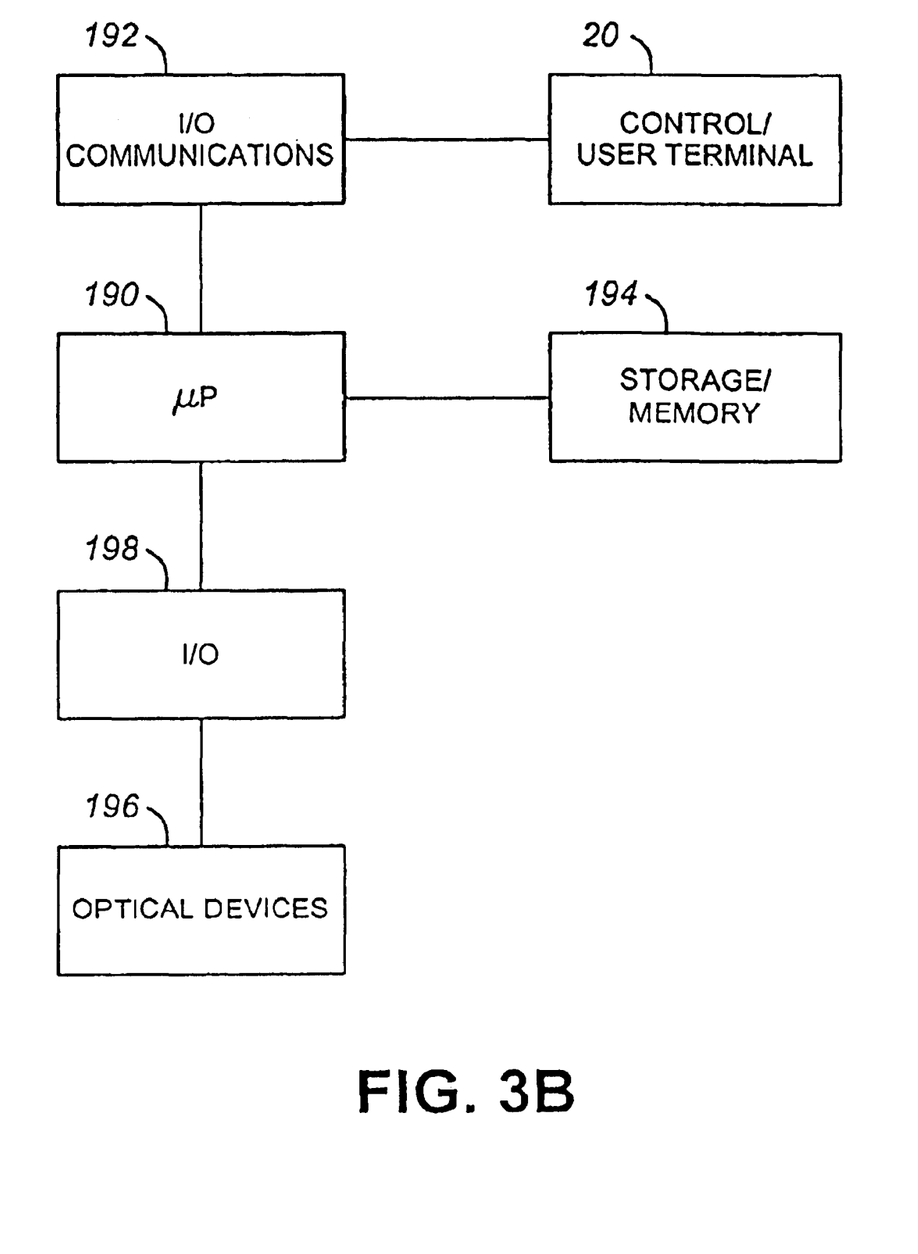
FIG. 3B is a block diagram of a high-level view of the internal components and functions of a subsystem controller.

Referring to FIG. 3B, a high level block diagram of the internal components of the subsystem controller is illustrated. It should be clear that such a gateway must have some intelligence or processing power. A processor 190 is at the heart of the subsystem controller. This processor can be a microprocessor, a DSP or any device that can provide a processing function. Coupled to this is an I/O communications device that can both send and receive data and messages between the processor 190 and the user terminal 20. Also coupled to the processor 190 is digital storage and memory for storing code and data. This can take the form of flash memory, ROM, RAM, and any of a number of memory and storage devices. To act as an interface between the physical optical devices 196 is an I/O interface 198. This I/O interface acts as between the digital side of the processor and the analog side of the optical devices.

While the above explanation and figures are general, it should be quite clear that there are many possible configurations to implement the above architecture. The following is an example of one of these configurations and how it may be implemented.

Figure 4:
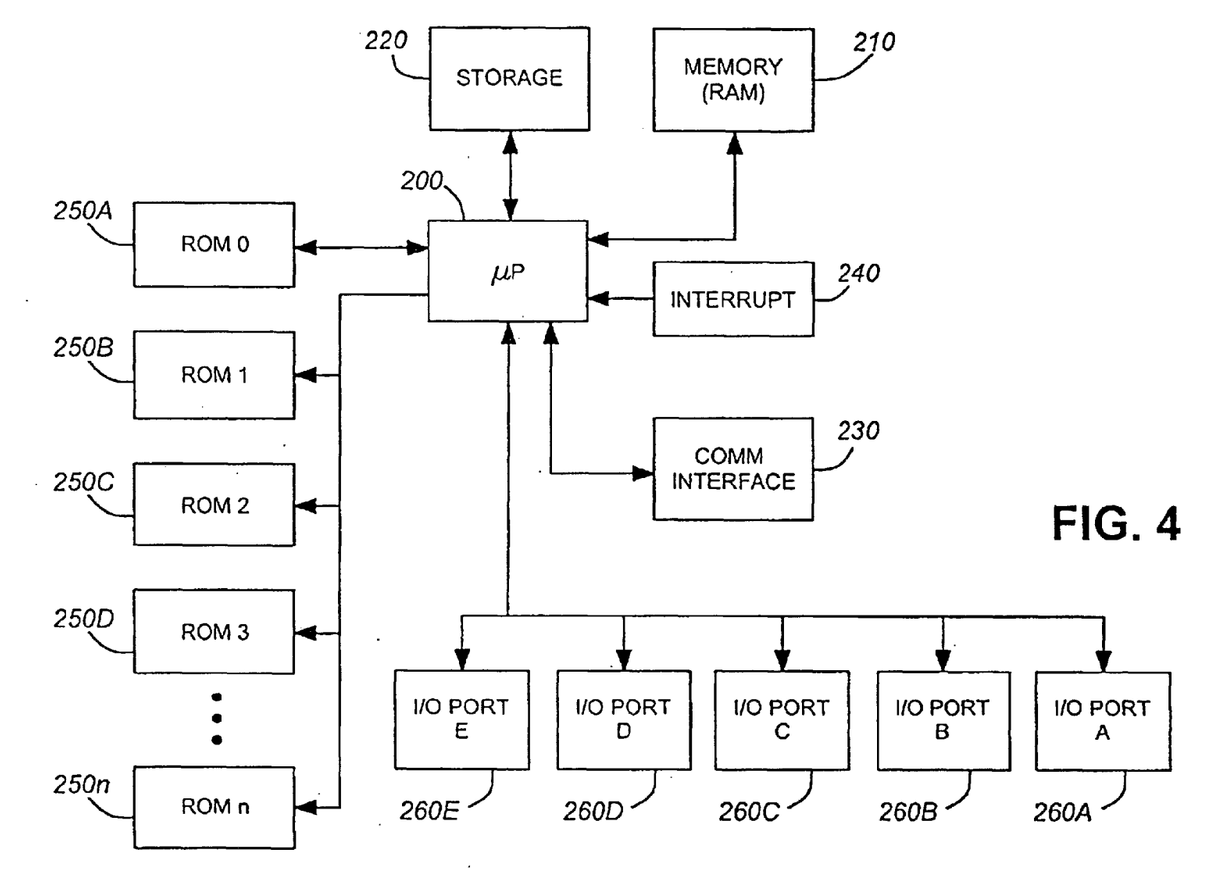
FIG. 4 is a detailed block diagram of the generic subsystem controller illustrated in FIGS. 2 and 3.

Referring to FIG. 4, a detailed block diagram of the generic system controller 160 is illustrated. At the heart of the system controller is a microprocessor 200. Coupled to the microprocessor is random access memory (RAM) 210, and digital storage 220. A communications interface 230 is also coupled to the microprocessor 200 along with an interrupt controller 240. Also communicating with the microprocessor 200 are multiple ROM (read only memory) banks 250A, 250B, 250C, 250D, . . . 250n. To communicate with the optical devices, multiple I/O ports 260A, 260B, 260C, 260D, and 260E are provided. The communications interface 230 communicates with the user terminal 20. The memory 210 provides temporary storage while more permanent storage is to be had with digital storage 220. ROM bank 250A stores an operating system (OS) that is the main program for the system with the other ROM banks 250B–250n each store specific subroutines which will be executed as needed.

Figure 5:
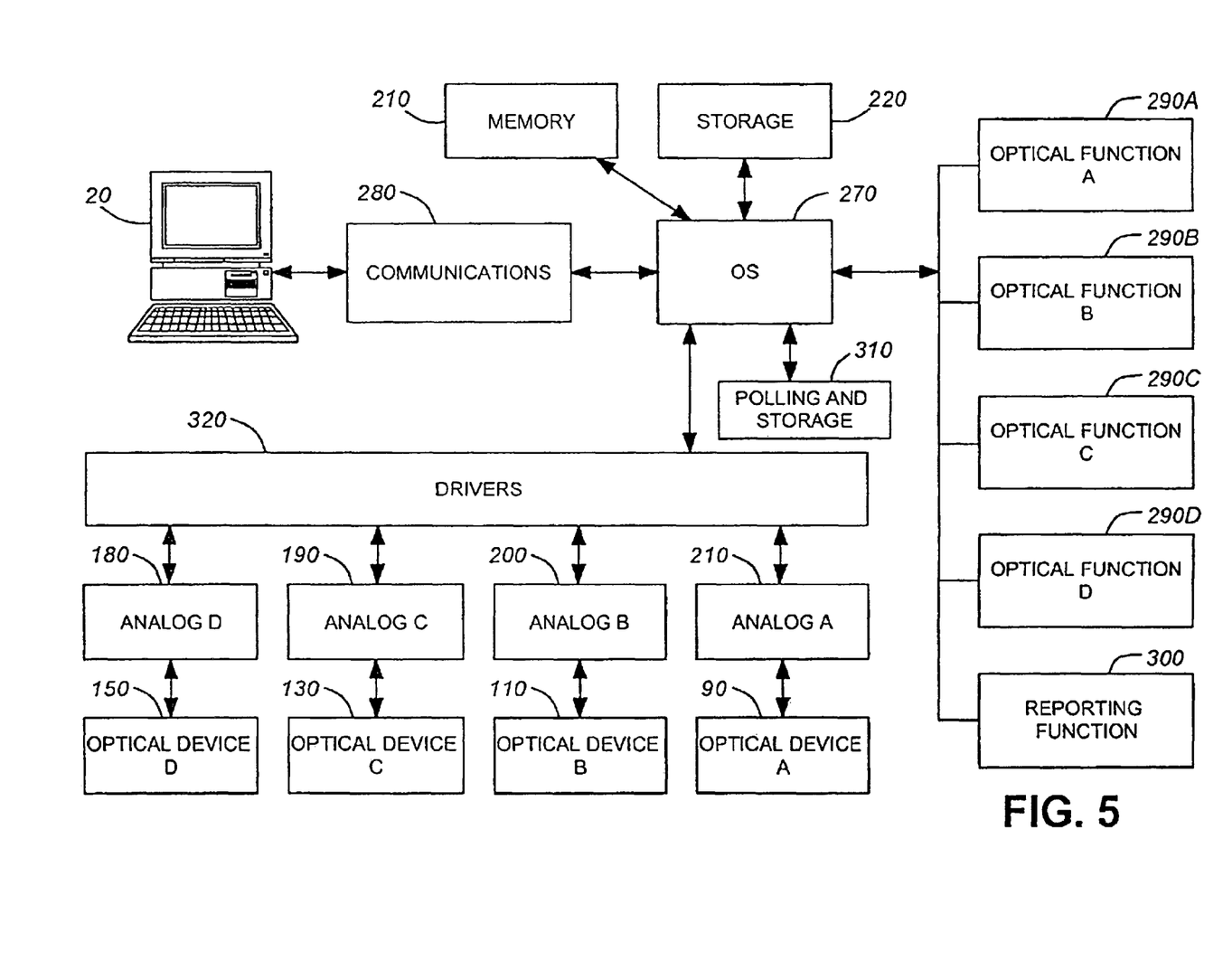
FIG. 5 is a block diagram of the software modules required for the architecture of FIGS. 2 and 3.

While FIG. 4 illustrates the hardware required for the system controller, FIG. 5 illustrates the software required. In the middle of the software is the operating system (OS) 270. Communications with the user terminal 20 are handled by a communications module 280 which works with the communications interface hardware 230. Multiple optical functions modules 290A, 290B, 290C, and 290D are called by the OS 270 when needed. A reporting function module 300 is also present and can be called upon by the OS 270 when required. A polling and storage module 310 is coupled to the OS 270 generating interrupts at specific time periods. A drivers module 320 provides the digital layer function shown in the architecture of FIGS. 2 and 3. The drivers module acts as the interface between the digital domain of the controller and the analog domain of the optical device.

In terms of function, the software modules illustrated in FIG. 5 have the following functions:

Operating System

The operating system coordinates the internal data flow among the different software modules. It also handles memory management and storage management. This means that the OS allocates memory space for the different processes along with allocating storage space for status report from the different optical devices and for any other processes which may require storage. The OS also handles the interrupts generated by the polling and storage module.

When required, the OS receives a command from the user terminal via the communications module and determines which optical function module is to be executed. This is done with the use of an internal table that documents which optical function module corresponds to which optical device. The OS thus receives the command, determines which module is to be activated, activates that module, and sends the command to that module. After this, the OS receives a packet that the called module produces based on the command. The OS routes this packet to the proper driver for eventual transmission to the correct optical device.

The OS also facilitates reporting to the user terminal. When the terminal requests a status report from a particular optical device, the OS routes that request to the reporting function module 300. The reporting function module then produces a packet for transmission to the user terminal. This packet is received by the OS and is routed to the communications module 280.

Error handling for the system is also dealt with by the OS. On the occurrence of an error, whether because of an optical function module or a malfunction of an optical device, the error generates a message to the OS. The OS then classifies the error and creates an error reporting packet for transmission to the user terminal via the communications module 280.

Command validation may also be handled by the OS. After the OS receives a packet or a message from the communications module, the OS checks that message for a valid command. Command validity is determined by a combination of determining which optical function module is to be called and what commands are valid for the module. Another internal table can document which modules can accept which commands. After the OS determines which module is to be called, the OS also checks this second internal table to determine if the command is valid. If the command is not valid, an error signal is generated. If the command is valid, then the command is passed on to the activated function module.

Also included in the functions of the OS are those which can be classified in three main categories: manufacturing, fault (errors), and performance.

Under the manufacturing function category are the requirements related to identification functions. This includes identifying the control system's serial number, the hardware and software versions of the system, and the system's unique identifier tag (IP address). Thus, any identifier related functions are to be handled by the OS. A specific and predetermined portion of the ROM bank containing the OS will have the identifier data mentioned above. Any requests for identifier data will cause the OS to retrieve this data and use it to reply to the query.

Under the fault category are the different conditions which may trigger an error or a fault message. While the polling and storage module handles the periodic polling for real-time operating data for each optical device, the OS also functions as a watchdog over the results. When installing and configuring an optical device to work with the control system, the acceptable operating parameters or the absolute minimum or maximum thresholds for that optical device is programmed into the OS.

The OS refers to the above thresholds when checking the responses to the polling queries. When the drivers module receives a packet from the optical device in response to a polling query, this packet is identified as such and is routed by the OS to the polling and storage module. While doing so, the OS checks the values in the packet with the programmed thresholds. If a parameter exceeds the maximum threshold or is below a minimum threshold, the OS automatically generates an interrupt along with an alert message to be sent to the user terminal. The alert message will inform the user terminal of an anomalous condition.

The message may be specific in identifying the condition and the optical device if the condition is critical or the message may simply be a generic warning message that an operating parameter is not within programmed tolerance. A critical condition may be when an optical device times out in not sending a reply to the polling query. A timer function times out when a set time period expires without a response to a polling query. If a number of consecutive timeouts are encountered for an optical device, the OS generates a high priority alert that the device may be down. On the other hand, a "routine" alert may be a slight over voltage at an optical device. Clearly, however, catastrophic failure of a device, such as a total shutdown or failure of a device, will cause a high priority alert to be generated by the OS. This can be detected by the OS if a device is not responding or if the device itself warns the OS of imminent failure.

The different values that the OS may check for error or fault may include temperature, current, voltage, input condition, and output condition. Under temperature, the OS monitors not only component or device temperature but also the overall temperature of the control system itself. For current, the OS may monitor the current if the current supplies are in the hardware. For voltage, power supply failure and tunable filter voltage control failure would affect the voltage level reported. A loss of signal condition (LOS) means that there is input failure or that the optical input is below the expected range. A fault or error in output condition can be an output failure—the output is below the expected range.

Under the performance category, the OS can also monitor and assess whether an optical device is performing within acceptable performance parameters. It should be noted that under the fault category, the OS is assessing whether the device is operational or working while under the performance category, the OS is assessing how well the device is working. As noted above, the OS examines the responses to the polling query. Aside from determining whether the optical device meets the thresholds, the OS also determines whether the device meets certain performance criteria. This performance criteria can be set by the user terminal and is stored as a variable in the digital storage. The criteria is set as a set of values that an optical device must meet in order to be considered as operating within acceptable parameters. These parameters are values such as optical signal level, optical signal noise level (optical signal to noise ratio or SNR), and even such parameters as temperature, current, and voltage.

The OS assesses the above parameters and, when the optical device is not performing adequately, the OS may either send a message to the user terminal or the OS may change the settings of the optical device itself. The input to the device may be assessed in terms of optical signal level or SNR for either the device as a whole or on a per channel basis. The output of the device may also be assessed on the same bases. For the OS to control the optical device directly, when the OS detects a low performance parameter for a specific device, the OS formulates a message for the relevant optical function module. As an example, if the OS detects a lower than desired output signal level for an amplifier, the OS can create a message for the amplifier optical function module instructing the relevant amplifier to boost its gain setting. The amplifier optical function module then receives this message and creates a packet for transmission to the drivers module for eventual transmission to the relevant amplifier.

Communications Module

The communications module 280 handles communications between the control system and the outside world. It handles IP MAC (media access control), encryption, decryption, and authentication. When a message is received by the communications module, either from a user terminal or perhaps from another control system, the communications module first authenticates the message to ascertain whether the message is for this particular control system. This is required especially if the architecture used is that illustrated in FIG. 3 with multiple identical control systems all coupled to a common user terminal. IT should be clear that while the control systems in FIG. 3 are identical, each one has a unique identifier tag of address, not unlike a node in a network. If the message received by the communications module is not authenticated, meaning that the message was not meant for this particular control system, then the message is ignored. IF the message is authenticated, then the message is passed on to the OS for handling.

Authentication is handled by checking if the optical device being commanded by the message is one that the particular control system controls. This can be done by having a lookup table placed in storage detailing the addresses of the optical device or devices which are connected to the control system. The communications system then only has to extract the address of the optical device being commanded and compare this with the addresses in the lookup table.

In terms of encryption and decryption, the communications module encrypts any outgoing packets so that it can be transmitted to the user terminal. Any incoming messages are, in turn, decrypted from their transmission format so they can be utilized by the control system.

The communications module also routes outgoing messages to their intended recipient. Thus, if multiple user terminals are present, the communications module will address an outgoing message so that the message is routed to the proper user terminal.

Polling and Storage Module

The polling and storage module generates periodic interrupts which causes the OS to send polling messages to specific optical devices under the control of the control system. Essentially, the polling and storage module polls the different optical devices for a status report in a round robin fashion. The status reports received by the OS in response to these polls are then stored in the digital storage. Thus, as an example, if there are five optical devices connected to the control system and a polling interrupt is generated every minute, then each optical device is polled every five minutes. Each polling response is then stored over its previous report. The control system thus has five storage slots for the reports of the five devices.

The polling and storage module, when generating a polling interrupt, generates a generic interrupt with the identity of the device to be polled as a parameter. The OS then generates a polling request that is sent to the requested device. The response to this request, when received, is send to the polling and storage module. Once identified as being from a specific device, through the address embedded in the polling response, the polling and storage module then stores the report in its specific area in the digital storage.

For the stored polling responses, a set number of fields can be provided for each optical device. These fields are then populated by the polling and storage module if and when required.

Reporting Module

The reporting module deals with requests from the user terminal for the status reports on specific optical devices. Once a status request is received by the OS, the parameters of this request are passed on to the reporting module. The reporting module then retrieves the currently stored report for the requested optical device. This stored report, stored by the polling and storage module, is then used to create a reporting message for the user terminal. Once the reporting message is complete, the message is passed to the OS to be passed to the communications module. The communications module then properly addresses the message, encrypts it, and transmits it to the user terminal.

Optical Function Modules

Each optical function module corresponds to a different optical function and, therefore, to a different type of optical device. When a command from a user terminal is received by the OS, the OS determines which optical function module must be activated. Once this has been determined, the chosen module is activated and the parameters of the command are sent to the chosen module. The optical function module then receives the parameters and the command. Based on this command and parameters, the optical function module creates a packet for transmission to the optical device. The packet contains specific directions for executing the command on the physical optical device.

As an example of the above, if the device being addressed is a multiport amplifier and the command is to increase amplification in PORT1 by 5% while decreasing the amplification in PORT5 by 10%, the packet would have multiple commands. The optical function module would have to first retrieve the current settings of the device from storage so that the proper settings can be calculated. Once the current setting have been retrieved, the new settings are calculated and packaged in a packet for routing to the drivers module. With the packet ready, the OS receives the packet and routes it to the drivers module.

Each optical device module will have its own set of commands and its own set of optical devices for which it will act. As an example, there will be a separate optical function module for add/drop multiplexers, cross-connect switches, amplifiers, and attenuators. It should be noted that it is possible to have multiple instances of one type of optical device controlled by the control system. This means that if two amplifiers are attached to a control system, the optical function module for amplifiers will be used by both physical optical amplifier devices. It should also be noted that each optical function module is resident on one of the ROM banks attached to the microprocessor. If an updated version of a module is released, the update can be effected by simply replacing the relevant ROM bank. As a further possible enhancement, the ROM banks can take the form of an electronically erasable read only memory (EEPROM). Such a ROM would allow periodic updates without the need for physically replacing the ROM chip.

Drivers Module

The drivers module is, architecturally, in the position of the digital layer shown in FIGS. 2 and 3. The drivers module receives packets routed to it from the optical function modules. The drivers module then converts these specific instructions into instructions which can be understood and used by the analog hardware modules.

The drivers module also routes its converted instructions to the appropriate I/O hardware port. Since the instructions it receives are addressed to a specific optical device, the drivers module can simply check an I/O routing table for the correct I/O port for a specific optical devices.

Figure 6:
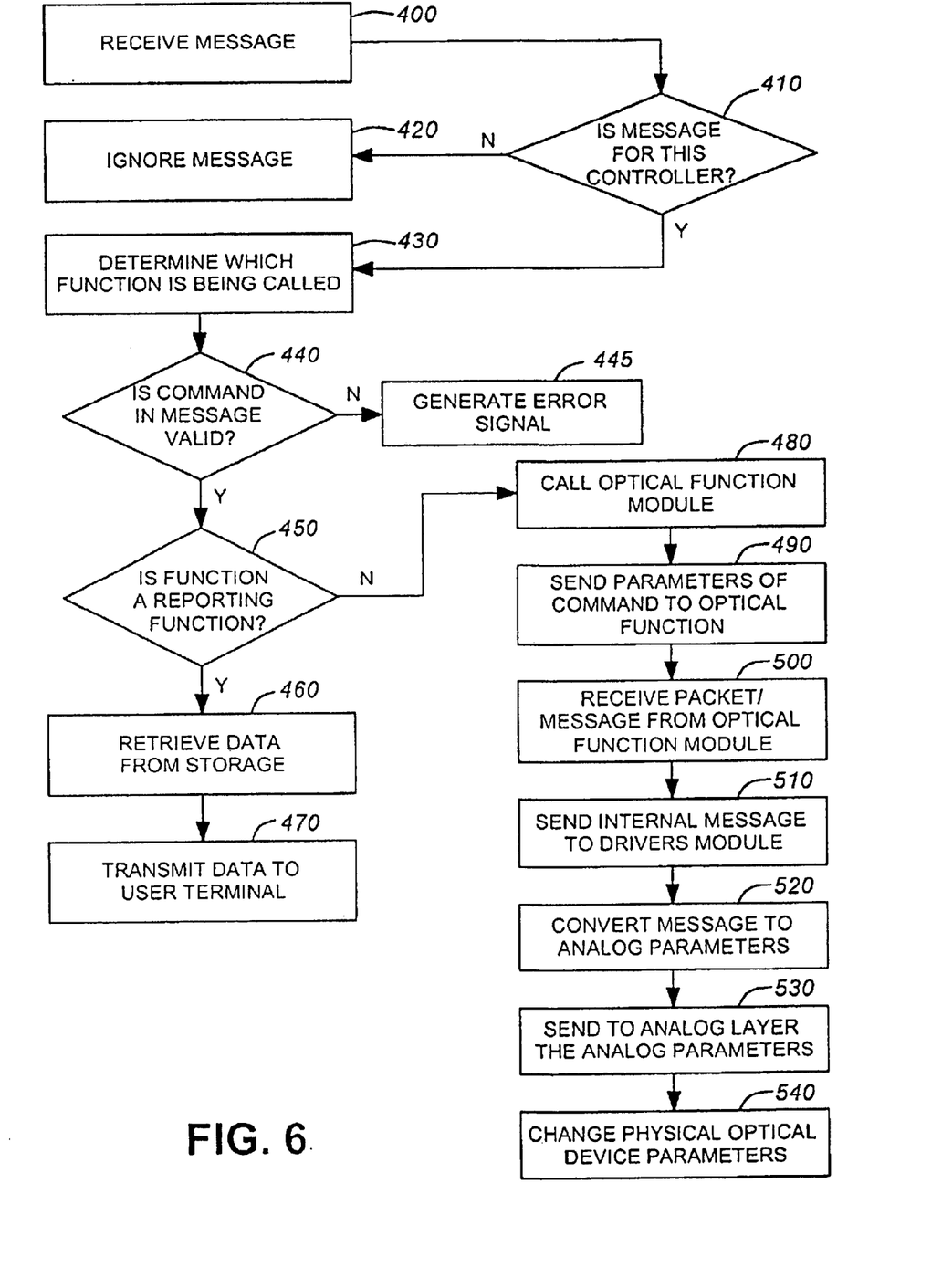
FIG. 6 is a flowchart detailing the steps taken by the control system when a message from the user terminal is received.

To further explain the interaction between the different software modules, FIG. 6 is a flowchart detailing the steps taken when a message from the user terminal is received. The process begins with step 400, that of receiving the message at the communications module. Step 410 is of deciding whether the received message is meant for this particular control system. If the message is not authenticated, meaning that the message is not meant for this control system, then the message is ignored (step 420). If, on the other hand, the message is authenticated, then step 430, taken by the OS, is to determine which optical function module is required. Once the module is determined, decision 440 validates the command. If the command is not valid, step 445 generates an error signal for transmission to the user terminal. If the command is validated, decision 450 is taken next.

Decision 450 asks if the module chosen is the reporting module. If so, then step 460 details retrieving the relevant polling data from storage. Also in step 460 is the packaging of the data into a format accessible and acceptable to the user terminal. Step 470 then transmits the packaged data to the user terminal. Step 460 is executed by the reporting module while step 470 is executed, in combination, between the OS and the communications module.

If the module chosen is not the reporting module, then step 480 is of executing the optical function module chosen.

Step 490 is passing the parameters from the message to the optical function module chosen. Steps 480 and 490 are both executed by the OS.

After steps 480 and 490 are executed, the function module processes the parameters in the message and creates a packet for transmission to the optical device. Step 500 is that of the OS receiving the packet from the function module. Step 510 is of the OS sending the packet to the drivers module. The drivers module then converts the packet into analog instructions (step 520) and routes these instructions to the proper I/O port for transmission to the analog layer (step 530). Step 540 is of changing the physical parameters on the optical device in response to the analog instructions received by the analog layer through the I/O port.

Figure 7:
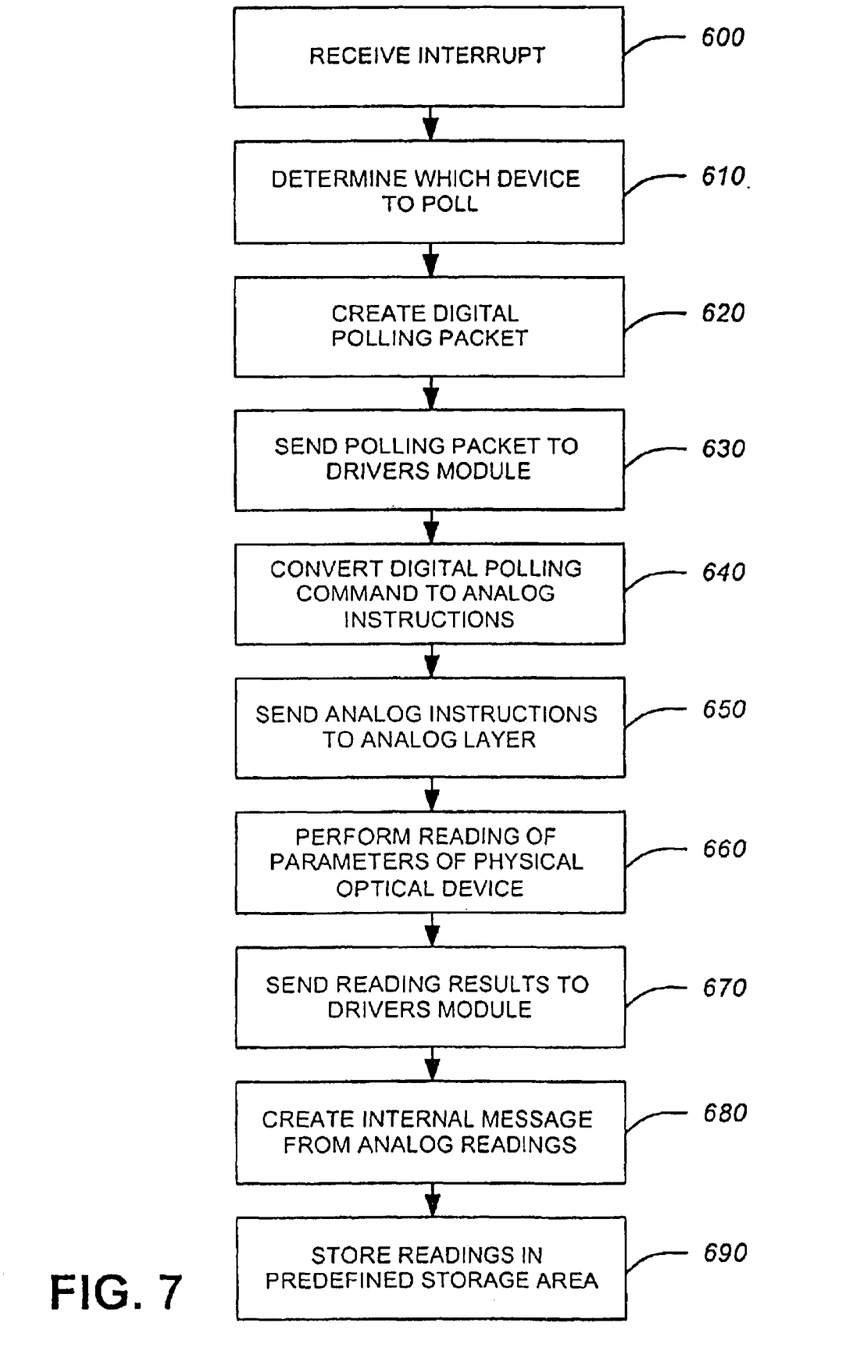
FIG. 7 is a flowchart detailing the steps taken by the control system when polling a specific optical device.

For polling, FIG. 7 illustrates the steps involved. Step 600 is that of first receiving the interrupt at the OS generated by the polling and storage module. Step 610 is of determining which device is to be polled. This decision is taken by the polling and storage module and its results are sent to the OS. Step 620 is that of creating a digital polling packet at the polling and storage module for transmission to the drivers module. This packet, with the proper optical device address and the proper parameter requests, is then sent to the drivers module in step 630. The drivers module then converts this packet into analog instructions specifically for the analog layer (step 640). The drivers module then routes the analog instructions to the proper I/O port for transmission to the relevant analog layer (step 650). Step 660 is that of the analog layer and the optical device working together to gather the data required by the analog instructions in response to the polling. This data is then sent back to the drivers module (step 670). The drivers module then creates a digital packet from the analog data (step 680) and sends the digital packet, suitably identified as polling results, to the polling and storage module. This module then stores the received data in the relevant storage space (step 690) for retrieval when required.

To facilitate communications between the user terminal and the control system, a common communications protocol is used. This protocol takes the form of a packet-based system. When sending a message to a control system, the message takes the form of a datagram with a message descriptor. The message descriptor details the optical device to which the message relates, the command, the relevant port in the control system, at least some of the relevant data, and how many packages are following the message. This protocol can also be used as an internal protocol for the control system. The fields in the descriptor of the protocol are illustrated in FIG. 8.

Figure 8:
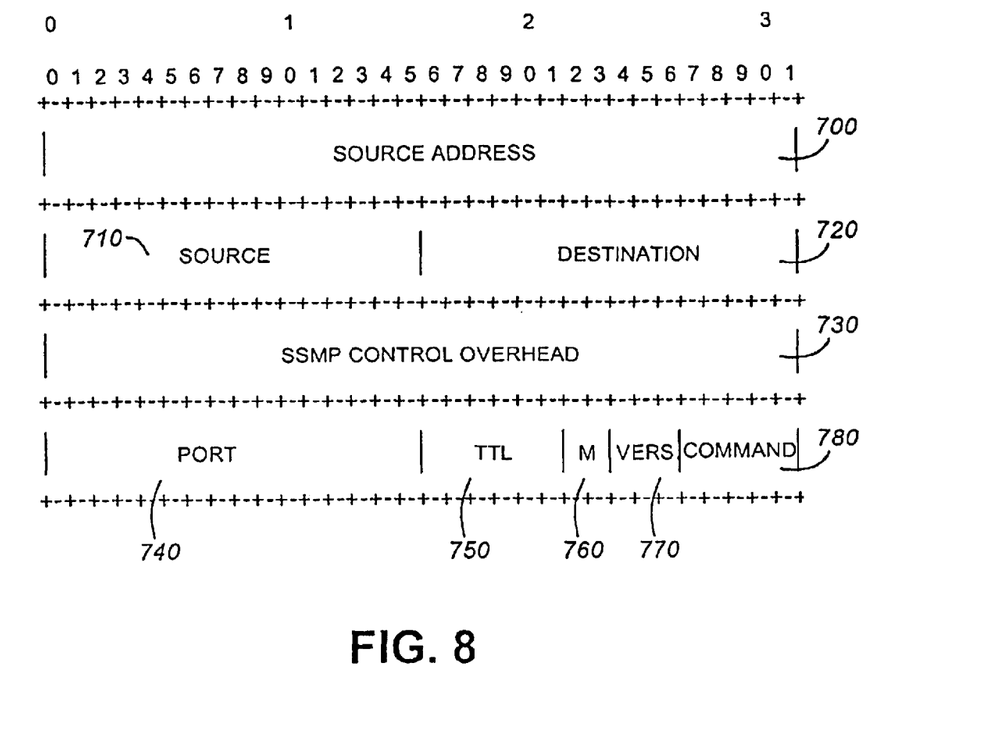
FIG. 8 is a diagram illustrating the fields in a descriptor according to a protocol explained below.

Referring to FIG. 8, the first field in the descriptor is the source address field 700. This source address field defines where the message is from, a control system or a user terminal. Source field 710 and destination field 720 refer to the specific optical device to which the message pertains. This field is one of the fields referred to by the OS in determining which optical function module to call and by the communications interface as a double check to determine if the message is meant for the control system. The system overhead field 730 is where the data required will be placed. It will include not just the parameter to be adjusted but also the type of the optical device that is being addressed, a time/date stamp, and the amount of change required for the parameter. A port address 740 denotes the port to which the optical device being addressed is attached while a TTL field 750 indicates if TTL logic is to be used instead of the default RS232 logic.

The M field 760 indicates how many more packets are to follow while the VERS field 770 indicates the protocol version being used. The command field 780 indicates the command to be executed for the optical device.

As an example, if a user terminal (IP address= USERTERM), wants the optical amplifier at the address AMP1, located at the port PORT1 of the control system, to have a gain setting of GAIN1, the descriptor fields would have the following values:

| | |
|---|---|
| source address = | USERTERM |
| source = | NULL |
| destination = | AMP1 |
| system overhead = | DATE/TIME, gain = GAIN1, amp |
| port = | PORT1 |
| TTL = | NULL |
| M = | 0 |
| VERS = | 1.00 |
| command = | SET |

To explain the system overhead field, the subfields are delimited by commas. This means that the parameter to be set is the gain parameter, the value of the parameter is GAIN1, and the type of device being addressed is an amplifier.

The control system will thus receive the message, check the descriptor, and confirm that the device AMP1 is connected to the control system.

As noted above, the protocol can be used internally by the control system as well. Using this model, the OS receives the validated message and determines which function module to execute. Since the device referred to is AMP1 and since the device type is denoted as an amplifier, the OS can use the internal table to ascertain that this device is to use the amplifier optical function module. The command in the message is then validated by the OS and is passed on to the amplifier optical function module. The data is also routed by the OS to the function module as part of the message.

After receiving the message, the amplifier function module creates its own message for the drivers module. This message is addressed as an internal message and will contain specific data and instructions for the drivers module to pass on to the optical device itself. To denote its internal message character, the source address field of the message has a NULL value, alerting the OS to route it as an internal message.

A sequence similar to the above is followed by the polling and storage module when initiating a polling query. To initiate a polling query, the polling and storage module issues a message with a descriptor having a NULL source address, a NULL source field, and a READ value in the command field. The port field and the destination field will correspond to the optical device being polled. Once the poll query descriptor is received by the drivers module, the READ command triggers a subroutine in the drivers module that executes specific commands relating to a poll. These commands are sent to the port denoted by the port field, causing the device connected to that port to try and respond to the polling query.

After the polling query is answered, the drivers will receive the response data from the optical device and the drivers module will create at least one internal message containing the data. This response message will, again, have a NULL in the source address field to denote an internal message. Also, the source field and the port field will correspond to the address and port of the optical device responding to the poll. The destination field will, however, have a NULL value, denoting an internal response to a polling query. The data responding to the poll query will be contained in the overhead field and if the data does not fit in one internal message, then the M field will note that further messages are coming. The command field will have a value of DATA to denote that the message is a data message. These data messages are received by the polling and storage module and their data is extracted and stored in the digital storage.

When a message from a user terminal requests a report on a specific optical device, the OS passes this message to the reporting module. The reporting module then determines which parameters are being asked for or if a general report is requested. This determination will be made based on the data contained in the system overhead field. The request for a report will be denoted by a READ value in the command field. Since the source address field is not a NULL, then the OS will know that this request message is not a poll query. The report module, now aware of which type of report is requested and which device is to be examined, will retrieve the relevant data from the digital storage. This data will then be encapsulated in a new message created by the reporting module. This message will have the data in the overhead field and will be addressed to the user terminal. It should be noted that multiple messages may need to be sent in response to a single report request.

As noted above, the message protocol format illustrated in FIG. 8 can be used internally by the control system. To denote a message which will only be for internal use within the control system, the source address field will have a NULL value. A value other than NULL in the source address field will denote a message which has either been received from outside the control system or is meant to be transmitted outside the control system. A message to be sent to the drivers module from within the control system will have a NULL in both the source address field and in the source field. A NULL in the source address field and in the destination field means that the message is a response to a polling query and must then be routed to the polling and storage module. It should also be noted that a message from the control system to the user terminal may have a NULL value in the destination field as the user terminal and not an optical device is the end destination of the message. Furthermore, it is also possible for an outside message entering the control system to have a NULL in the source field as the source of the message is a user terminal and not an optical device.

To facilitate in the transport of the message, the message having the format as shown in FIG. 8 can be placed in one of the unused slots in a SONET header frame or in the header of any frame using a different standard. This will be simple given that the format shown in FIG. 8 occupies no more than 16 octets for a total of 128 bits. Addressing the message to the specific control system is not required, as the header frame will have its own destination address. To further save on space, the command field will use a numeric coding to denote different commands. As such, these commands can use the following coding:

| Code | Command |
| --- | --- |
| 0 | (reserved) |
| 1 | DATA |
| 2 | CONNECT |
| 3 | DISCONNECT |
| 4 | SET |
| 5 | TEST |
| 6 | GET |

-continued

| Code | Command |
| --- | --- |
| 7 | LIST |
| 8 | ALARM |
| 9 | READ |
| 10–15 | (reserved) |

Of the commands listed above, DATA is to indicate the the message is carrying nothing but data in its overhead field. CONNECT and DISCONNECT relate to add/drop multiplexer and/or switches which can connect and disconnect specific lines. The SET command is for setting a specific parameter to a specific value. The TEST command initiates a test of an optical device while a GET command retrieves a specific parameter setting for an optical device. The LIST command relates to a reporting function—the reporting module can send a list of attached optical devices back to the user terminal when prompted to do so, along with all the settings for those devices. Or, the reporting module can list specific devices attached to specific ports on the control system. An ALARM is sent to the user terminal when a fault condition is detected. This "command" in conjunction with the data in the system overhead can send critical alarms, major alarms, warnings, or failure notifications to the user terminal. A READ command, as noted above, can be used to initiate a polling query and essentially to retrieve the status of a specific device.

Figure 9:
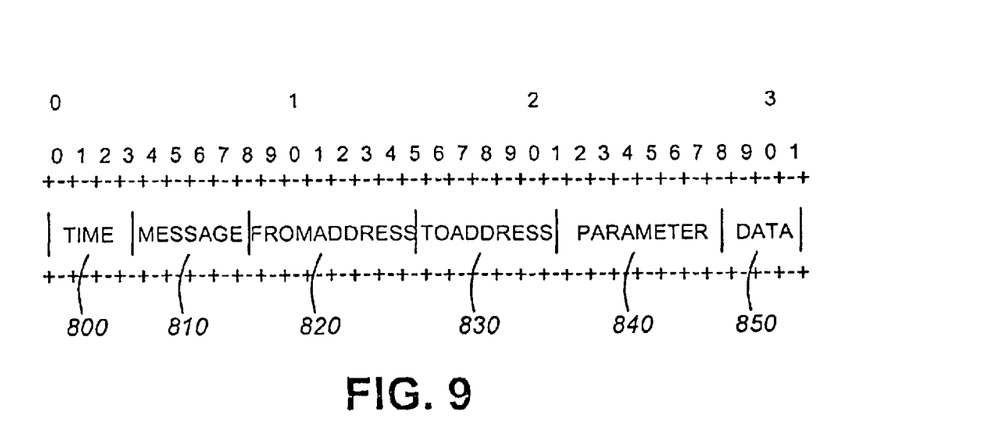
FIG. 9 is a diagram illustrating the fields in a the system overhead field of the descriptor of FIG. 8.

Referring to FIG. 9, a format for the system overhead field in the descriptor of FIG. 8 is illustrated. As can be seen, the system overhead field can be divided into 6 subfields—the Time field 800, the Message field 810, the FromAddress field 820, the ToAddress field 830, the Parameter field 840, and the Data field 850.

The Time field 800 is the time and date stamp for the message. It can use the mmddyyyy:hhmmss format.

The Message field 810 represents the type of command being carried by the message. These commands can follow the format of the commands listed above. The FromAddress field 820 contains the location ID for the optical device from which the message originated while the ToAddress field 830 contains the location ID for the optical device to which the message is destined. While the use of these two fields may seem redundant in light of the source and destination fields in the descriptor of FIG. 8, the use of these two fields in the system overhead data field reduces the amount of processing required to determine the source and destination of the message. The communications module checks the descriptor for validation while the system overhead field contents are examined by either the OS or by an optical function module. It should, however, be noted that the FromAddress can represent numerous entities—it can represent another node in the network from which the request originated, a user terminal directly connected to the control system, or another completely difference system from which the request originated.

For the Parameter field 840, its presence indicates which parameter of the optical device is to be amended. By including this in the system overhead field, the task of the optical function module is simplified in that the optical function module can access all the relevant data regarding a message in a single string variable. For this reason, the Data field 850 is attached to the end of the system overhead field.

An example of the above would be:
08232000:212259_SET_DENVCO22K09_
NAPACA02H04_XCON_I=YX/10(mA):SetCurrentDrive The time and date stamp at the beginning of the field is clear while the SET message is clearly visible as well. In terms of the FromAddr and the ToAddr fields, the string value notes that the message is from the Denver Colo. network 22K09 while the destination is Napa Calif. network 02H04. The parameter to be amended is the cross-connect and setting is 10 mA.

We claim:

1. A method of communicating between a user terminal and a control system controlling at least one optical device, the method comprising:
    a) creating a datagram at a source, said datagram having:
        a source address field;
        a source field denoting an address of a source optical device;
        a destination field denoting an address of a destination optical device;
        a system overhead field containing data; a command field containing an indication of at least one step to be executed regarding said data
    b) transmitting said datagram to a destination
    c) extracting said data at said source
    d) initiating said at least one step
    wherein said datagram is used internally by said control system to communicate between different modules in said control system.

2. A datagram for use in communicating between a user terminal and a control system controlling at least one optical device, said datagram containing:
    a source address field;
    a source field denoting an address of a source optical device;
    a destination field denoting an address of a destination optical device;
    a system overhead field containing data;
    a command field containing an indication of at least one step to be executed regarding said data
    wherein said datagram is used internally by said control system to communicate between different modules in said control system.

3. A communications signal transmitted between a user terminal and a control system for controlling at least one optical device, said signal having encoded thereon a datagram containing:
    a source address field;
    a source field denoting an address of a source optical device;
    a destination field denoting an address of a destination optical device;
    a system overhead field containing data;
    a command field containing an indication of at least one step to be executed regarding said data.

* * * * *